Figure 1:
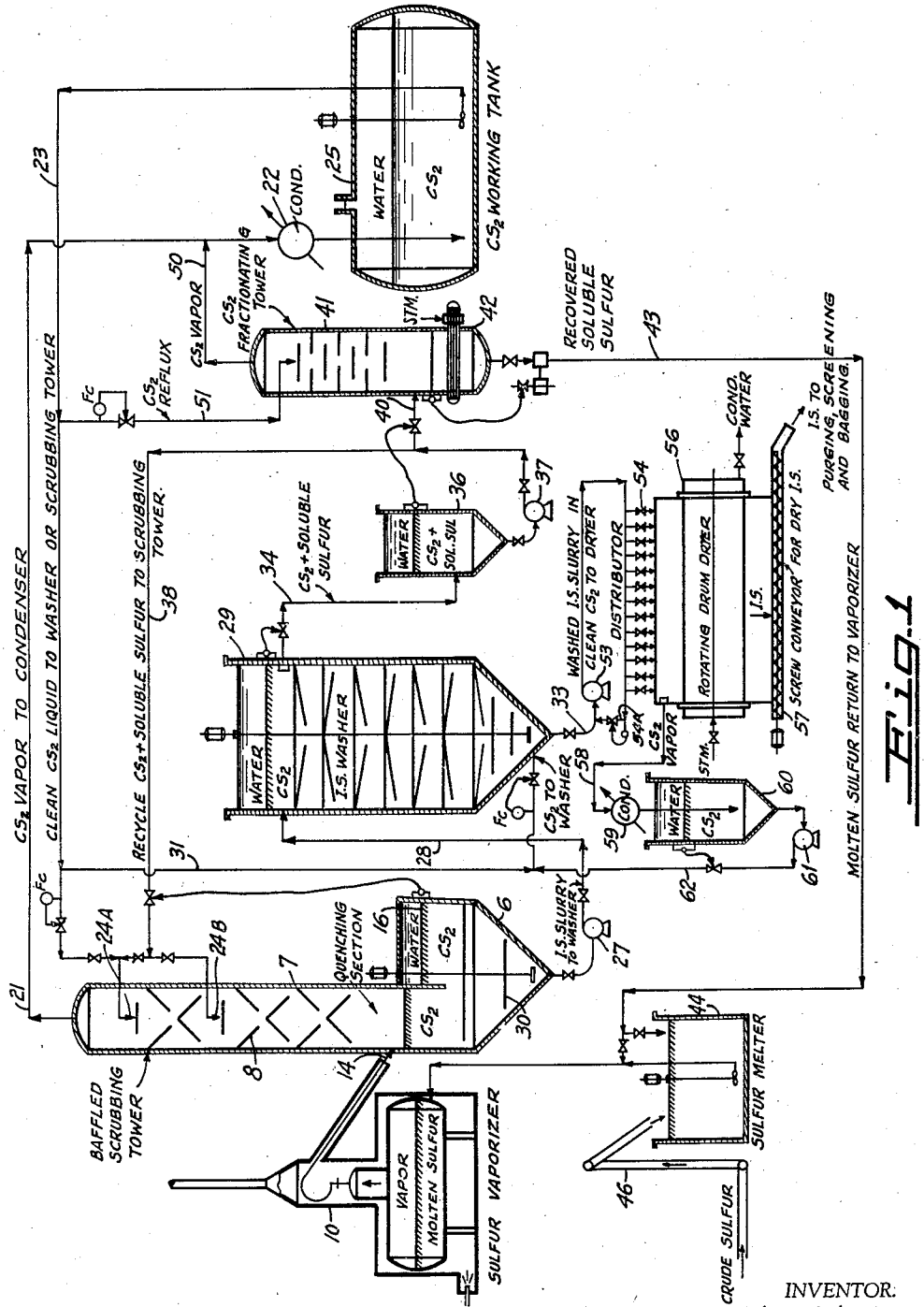

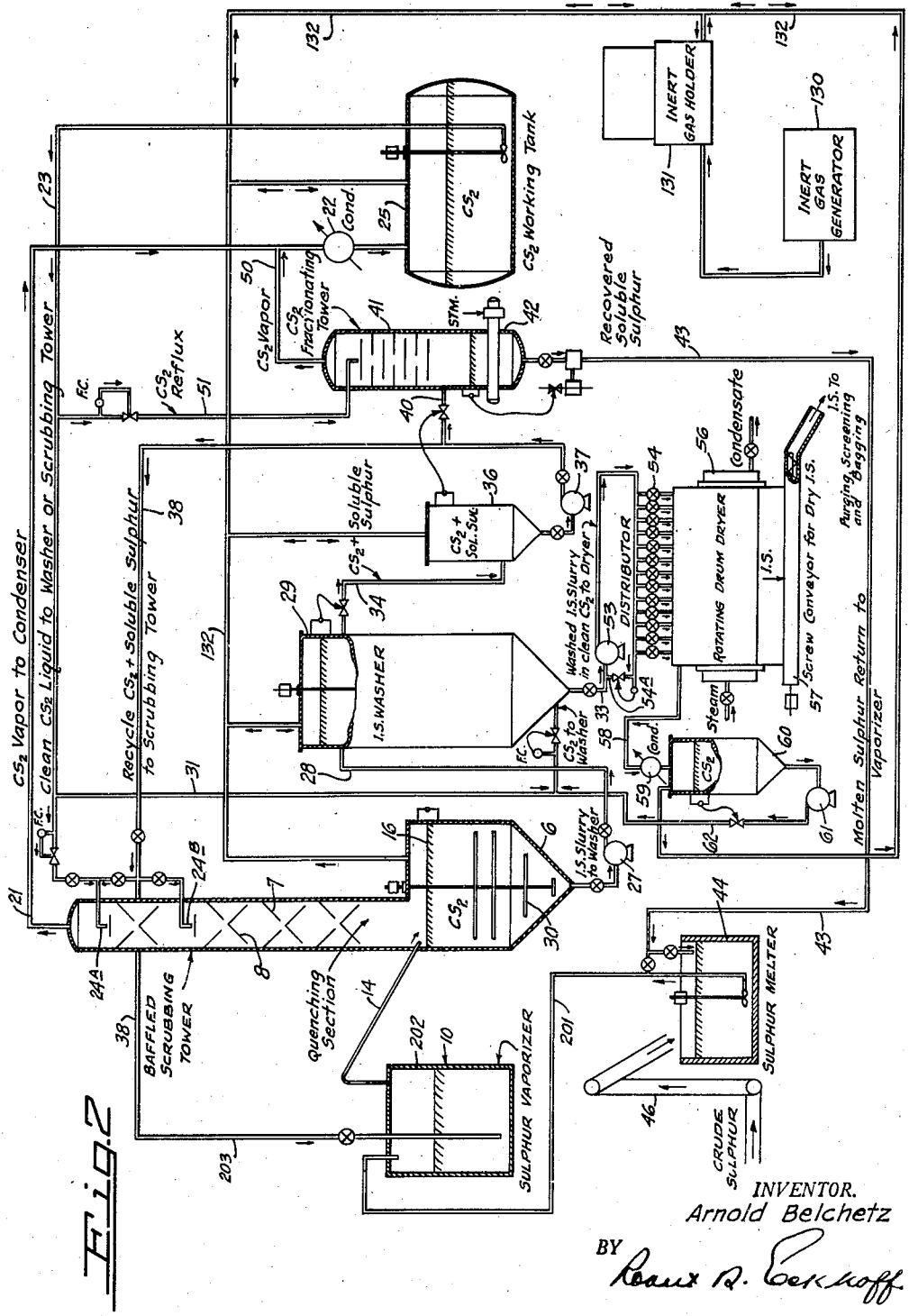

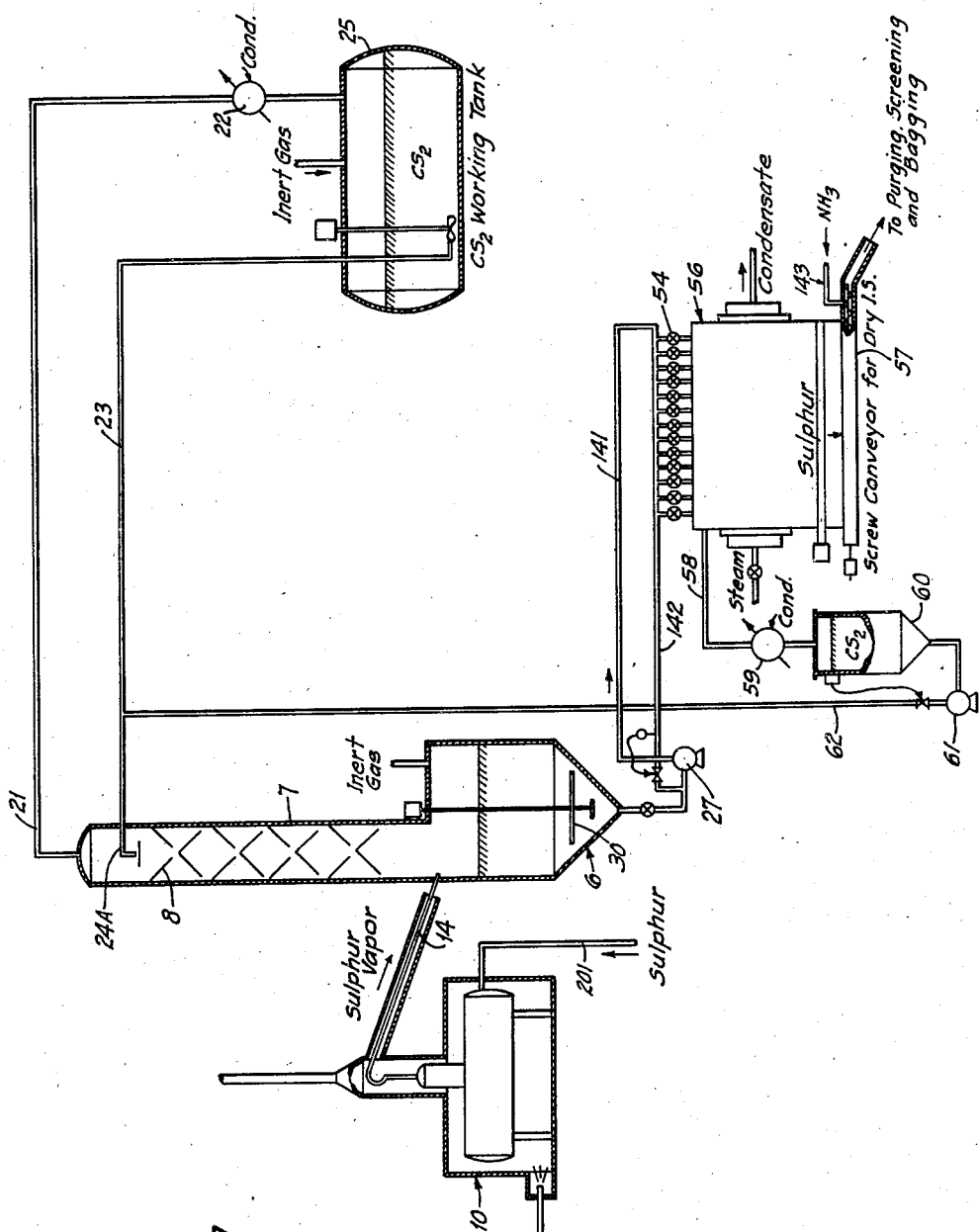

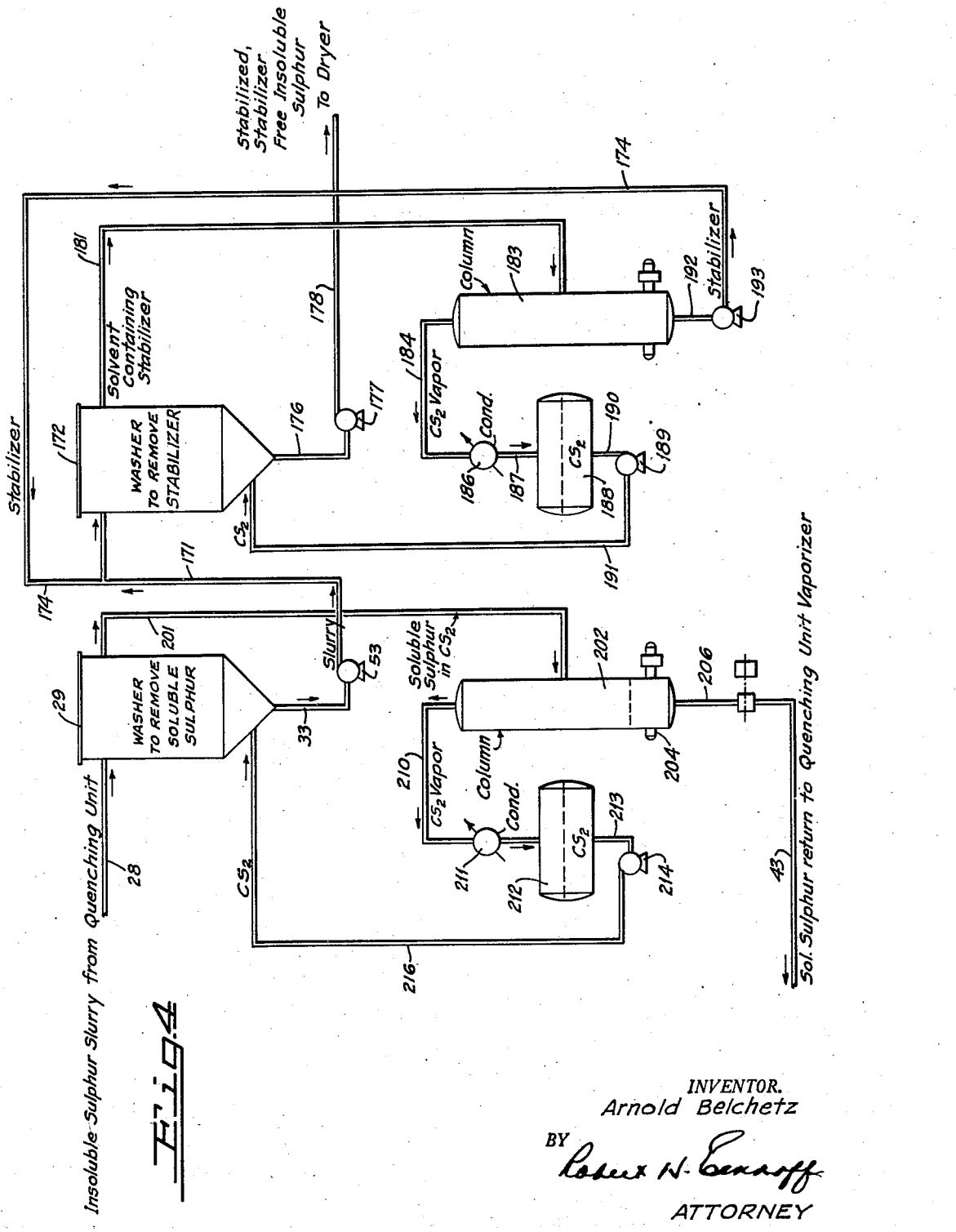

Patented Apr. 22, 1947

2,419,310

UNITED STATES PATENT OFFICE 2,419,310

SULPHUR PRODUCTION

Arnold Belchetz, Larchmont, N. Y., assignor to Stauffer Chemical Company, a corporation of California Application November 7, 1944, Serial No. 562,375

24 Claims. (Cl. 23—224)

This is a continuation in part of my application Serial No. 518,081, filed January 13, 1944.

This invention relates to the production of sulphur and to improvements in the methods of producing that form of sulphur which is identified as insoluble sulphur by its insolubility in carbon disulphide. Frequently, this material is referred to as sulphur mu. The invention is also concerned with production of a finely divided form of sulphur suitable for utilization in place of flowers of sulphur and other fine sulphurs produced by chemical precipitation or by mechanical methods such as milling and grinding.

I have found that by quenching sulphur vapor in a suitable non-aqueous medium such as carbon disulphide, the proportion of insoluble sulphur produced can be considerably increased over that secured, for example, upon quenching sulphur vapor in ice water. The operation is carried on by ejecting a high velocity stream of sulphur in gaseous form onto or into a non-reactive liquid which is vaporized at least in part, advantage being desirably taken of the latent heat of vaporization of the quenching medium to cool the sulphur. This enables the sulphur to be rapidly lowered in temperature below the melting point of sulphur and below the temperature at which rapid reversion of the insoluble form to the soluble form of sulphur occurs. The product is, therefore, generally characterized by a very high insoluble sulphur content, although the process can be so operated as to produce soluble sulphur in large amounts. The product secured is of a size suitable for use in place of flowers of sulphur or other fine sulphurs.

The process of this invention has inherently numerous advantages. For example, flowers of sulphur are commonly produced by cooling sulphur vapor in large brick chambers. This is a batch operation and is consequently relatively expensive; also, the capital investment required for practice of this batch process is considerable. In addition, the product of this invention is useful in the place of those forms of sulphur now produced by chemical precipitation or by grinding and milling solidified masses; these operations are likewise costly, requiring either involved chemical reaction apparatus or utilization of heavy, expensive mills operated only with considerable power input, and requiring the presence of an inert atmosphere in the grinding-separating system. Further, the advantage of the present invention in enabling the quantity of insoluble sulphur to be increased over that produced by quenching sulphur vapors in ice water is considerable, for the process of this invention enables a sulphur to be produced which initially has such a high insoluble sulphur content that the product can be used directly, and one does not have to resort to an expensive concentration operation. However, if desired, the concentrating operation can be practiced as part of the process of this invention, thus materially simplifying the equipment and the process required.

It is the general and broad object of the present invention to provide a novel process for the production of finely divided sulphur.

A further object of the present invention is to provide an improved process for production of insoluble sulphur.

The invention includes other objects and features of advantage, some of which, together with the foregoing, will appear hereinafter wherein I have outlined the preferred manner of practicing the invention.

In the drawings accompanying and forming a part hereof, and in which the same numerals indicate like parts or units, Figures 1, 2, 3 and 4 are diagrammatic apparatus representations illustrating various apparatus and flow sheets which can be employed.

THE QUENCHING OPERATION

Referring particularly to Figure 1, I have shown a tank 6 having a conical bottom. Extending vertically and depending for a short distance into tank 6 is a vertical tower 7, generally much smaller in diameter than the tank 6 and including a baffled section indicated at 8. A vaporized sulphur inlet 14 is provided in the bottom portion of tower 7, sulphur being supplied from a vaporizer 10.

Inasmuch as the nature of the apparatus will be made clearer, I will proceed with a further description of the process and operation of the apparatus:

To start the apparatus into operation, the several units mentioned are first purged with an inert gas such as carbon dioxide or an oxygen free, cold combustion gas; tank 6 is then filled with carbon disulphide or other suitable liquid, up to about the level indicated by line 16. Water is then placed upon the top of the carbon disulphide in the open portion of tank 6; this forces carbon disulphide up into the tower 7. Upon introduction of sulphur vapor through inlet 14, the temperature of the carbon disulphide body rises and carbon disulphide is vaporized and passes upwardly through the tower 7 to issue through line 21 and pass into the carbon disulphide condenser indicated at 22. The liquid fraction condensed is collected in tank 25 and returned through line 23 into the top of the tower through sprayheads 24A and 24B. The carbon disulphide so introduced into the tower acts as a scrubbing liquid to wash down any sulphur particles rising through the scrubbing tower as well as to maintain the proper content of carbon disulphide in the tank 6.

A precipitate of insoluble sulphur is formed in the carbon disulphide and the soluble sulphur content of the carbon disulphide gradually increases. If the carbon disulphide is not circulated to a sufficient rate it will be come saturated with soluble sulphur and both the soluble and insoluble forms of sulphur will precipitate to form a slurry in the tank. An agitator 30 maintains the slurry in suspension until it is removed by pump 27 which forces the slurry out through line 28 into a washer 29. It is necessary to maintain the quantity of undissolved sulphur in the carbon disulphide slurry within suitable limits so that it can be pumped. About 3.5 pounds of undissolved or suspended sulphur per gallon of carbon disulphide solution is the limit of fluidity. I prefer to keep the suspended sulphur content between 1 and 2.5 pounds per gallon of carbon disulphide; the extreme limits are between 0.01 pound and 3.5 pounds when carbon disulphide is employed as the quenching medium.

Effect of Retention

The product initially formed in tank 6 is a finely divided flocculent material somewhat rubbery and plastic. I have found that by retaining it at an elevated temperature for a sufficient period it loses its rubbery characteristic and becomes a well dispersed finely divided non-plastic solid. This change takes place more rapidly at an elevated temperature and one can employ temperatures between 35° C. and 70° C. As the temperature is increased, a shorter time of retention is required.

Since the carbon disulphide in tank 6 is at its boiling point (46.6° C. to 55° C. depending on the concentration of soluble sulphur in the carbon disulphide and the pressure maintained in the system) this is a convenient place to retain the product although the retention can be effected in a separate vessel. In tank 6 a retention time of from an hour to 24 hours may be utilized but I prefer to retain the product for from 1 to 4 hours. The shortest period of retention is usually desirable if a good yield of insoluble sulphur is required for some reversion to the soluble form may occur. The product, after retention, is of an average size of about two microns and is comparable to the finest sulphur produced by special, expensive grindings or "micronizing" operations. The retention can also be practiced after the product is removed from tank 6 and while the product is in the form of a slurry. If the retention at an elevated temperature is practiced on the final dry product a longer retention period is generally required.

The sulphur produced by the manner of operation so far described is a mixture of soluble and insoluble sulphur. However, because of its finely divided form and physical characteristics, it is useful as such, when separated from the carbon disulphide, in place of those finely divided sulphurs heretofore identified as flowers of sulphur manufactured by the various milling and grinding methods known in the art.

Separation of Soluble and Insoluble Fractions

It is also possible to treat the removed slurry to produce separate soluble and insoluble sulphur fractions. To accomplish this, for example, that portion of carbon disulphide removed through line 28 is introduced into the upper portion of a washer 29 wherein it is washed with fresh, sulphur-free carbon disulphide introduced through line 31 from line 23 to dissolve the soluble sulphur. The insoluble sulphur is removed as a slurry in clean carbon disulphide from the bottom of the washer through line 33, while the sulphur saturated carbon disulphide is removed at the top of the washer through line 34 into a water-sealed vessel 36. From the bottom of the vessel 36 the solution is taken off by pump 37, a portion being returned through line 38 to provide a recycle to the scrubbing tower 7 while another portion is introduced through line 40 into a fractionating tower 41. The fractionating tower includes a reboiler section 42 including a suitable steam heating coil. Soluble sulphur collects in the bottom of the tower and is returned in molten form through line 43 to the sulphur vaporizer 10 or to the sulphur melter 44 where it mixes with the crude sulphur introduced by conveyor 46 to provide a feed for the sulphur vaporizer. Carbon disulphide vapors released from the fractionating tower 41 pass through line 50 into line 21 and are condensed with the other vapors in that line in the condenser 22. A portion of the material forced through line 23 is returned through line 51 as reflux to the tower 41.

The slurry removed through line 33 by pump 53 is sprayed through distributor jets 54 onto a rotating drum drier 56. To maintain a high circulation rate through the distributor 54 a return line 54A is provided between the distributor and the inlet to the pump 53 to prevent the distributor from becoming clogged with insoluble sulphur. The dry insoluble sulphur product is removed from the bottom of the drier through screw conveyor 57 while the vaporized carbon disulphide is collected and take off through line 58 to be condensed in condenser 59 and collected in a water-sealed tank 60. From this tank the collected carbon disulphide is forced by pump 61 through line 62 to be returned to the washer 29 with carbon disulphide from line 31.

Example

In one operation, sulphur was vaporized at the rate of 300 pounds per hour. Sulphur vapor was introduced through inlets 14 at a fairly high velocity, about 100 feet per second, onto the surface of the liquid carbon disulphide in the lower portion of the baffled scrubbing tower 7, the sulphur being immediately quenched. The baffles in the tower were so arranged that the downcoming liquid carbon disulphide sprayed in through heads 24A and 24B kept the walls of the quenching sections thoroughly washed with liquid carbon disulphide and prevented any sulphur particles from adhering to the walls of tower or escaping in the vapors through line 21.

The actual quenching of the sulphur vapor takes place in the absence of water, the water seal on tank 6 being so arranged that water cannot enter the scrubbing tower. Of the sulphur produced in this operation, more than half was insoluble sulphur. This was separated from the soluble sulphur, pump 27 forcing the slurry into the top of the washer 29, wherein the insoluble sulphur passed downwardly through the washer against the countercurrent flow of carbon disulphide introduced at the bottom of the washer. The washed insoluble sulphur-carbon disulphide slurry was picked up from the conical bottom of the washer 29 by pump 53 for discharge through the distributor jets 54 to the drum drier 56.

EFFECT OF IRON AND OF WATER

If tank 6 or any other portions of the equipment include iron or mild steel, considerable corrosion may result if water is present, due to the interaction of the water with the iron, carbon disulphide and sulphur to form iron sulphide. This formation of iron sulphide is accelerated by operating at the boiling point of carbon disulphide and by the presence of soluble sulphur in the carbon disulphide. The presence of water even as a sealing medium, as I have indicated in Figure 1, may therefore make the use of iron-free equipment desirable. The presence of iron sulphide in the insoluble sulphur is in any event undesirable, since it discolors the product and has an adverse effect on its stability. It has been found that the presence of very small amounts of iron sulphide and water in the insoluble sulphur accelerate the rate of reversion to the soluble form on heating. It is thus very desirable that when the insoluble sulphur is subjected to the drying operation, the insoluble sulphur or the slurry containing the insoluble sulphur should be as free as possible from iron sulphide and water.

INSOLUBLE SULPHUR PRODUCTION

If a product having an initially high percentage of sulphur insoluble in carbon disulphide is desired, of the order of 90% and higher, and if this product is to have only a low rate of reversion to the soluble form under the most adverse conditions encountered in storage, I have found it highly desirable that the transformation of the sulphur vapor to a finely divided solid form be accomplished under substantially anhydrous conditions. If the liquid utilized to quench the sulphur vapor is anhydrous, then the insoluble sulphur product will be quite stable, providing contact with water is not permitted until after the material has been recovered and dried. In Figure 2 I have shown the apparatus and system of Figure 1 modified by substitution for the water seals of a source of inert gas 130 delivering gas to a gasometer 131 and from this through gas header lines 132 to tank 6, washer 29, separator 36, tank 25 and separator 60. Thus the sulphur production occurs entirely in an anhydrous system.

Water has a limited solubility in carbon disulphide, about 0.14% (wt.) at 100° F. I have found that if carbon disulphide saturated with water, but not containing any entrained, undissolved water, is used as the reflux to the scrubbing tower, good stable insoluble sulphur may be produced. This is due to the fact that sufficient heat is liberated in the quenching operation to vaporize slightly more than two pounds of carbon disulphide per pound of sulphur vapor quenched. This carbon disulphide vapor passes up through the scrubbing tower where it meets the downcoming carbon disulphide reflux containing the dissolved water. As the carbon disulphide reflux is heated to the boiling point of carbon disulphide, all of the originally dissolved water will be vaporized, by virtue of the vapor pressure of water at the boiling point of carbon disulphide. The carbon disulphide reflux thus becomes completely anhydrous as it passes down the scrubbing tower and thus when it comes in contact with the insoluble sulphur in the quenching chamber it will contain no water.

PRODUCTION OF MIXTURES OF SOLUBLE AND INSOLUBLE SULPHURS

When it is desired to utilize directly the sulphur produced by the quenching operation in tank 6, the discharge from pump 27 is taken off through pipe 141 and is delivered directly into the header 54 on the drier 56 as in Figure 3. Any undistributed slurry is returned to the inlet of the pump through line 142. The product removed from the drum drier through the screw conveyor 57 consists of a mixture of insoluble and soluble sulphur substantially in the proportion in which these are produced in tank 6. This product can be used as such, the product being characterized by its fine, uniform yellow color and its extremely fine state of division, being of a size comparable to that which can be produced only by special milling operations.

INTENTIONAL REVERSION TO PROVIDE SOLUBLE SULPHUR

In case it is desired to have the product entirely soluble in carbon disulphide, a small quantity of ammonia can be introduced through line 143 into the outlet from screw conveyor 57 to mix with the sulphur and cause the insoluble to revert to the soluble form. The addition of any suitable alkaline material to the sulphur will cause reversion of the insoluble sulphur to the soluble form and ammonium carbonate or other reversion agents can be employed. It is also possible to revert the sulphur by wetting it with a small quantity of water before it is dried. Once the material is dry it is difficult to wet and is, in fact, more stable and reverts more slowly than does the product made by extracting the soluble sulphur portion of flowers of sulphur with carbon disulphide and like solvents.

The dry product from conveyor 57 can be wet by bringing it into contact with water containing a wetting agent or by first wetting with methyl or ethyl alcohol and then with water.

QUENCHING MEDIA

In place of carbon disulphide, one can use any non-aqueous medium which is non-reactive with sulphur and sulphur vapor under the conditions of quenching. The medium should preferably be one which is a liquid at ordinary temperatures or without application of high pressure. It should also be capable of taking up heat readily and quenching the sulphur. Thus, one can employ benzene, toluene, or xylene. One can also employ petroleum hydrocarbon fractions of a suitable chemical nature so that they are not reactive under the conditions of quenching with the sulphur, such as petroleum naphtha or kerosene. Pentane and butane can also be employed; however, the use of either of these would preferably require a system operating at a pressure above atmospheric.

STABILIZATION OF INSOLUBLE SULPHUR

To reduce or prevent reversion of the insoluble sulphur produced to the carbon disulphide form, the product may be treated with a stabilizer; usually a halogen such as iodine, bromine or chlorine or a sulphur-halogen such as one of the sulphur chlorides or sulphur bromides can be used. The quantity of halogen or sulphur halogen required is quite small and the treatment is therefore easily effected. For example, a small quantity of halogen or sulphur halogen, 1% or even less by weight of solution, can be included in the carbon disulphide, or the atmosphere in drier 56 can carry the halogen. Since the halogens, particularly chlorine and bromine, react readily with sulphur to form sulphur halogens, these may be introduced either as the free halogen or sulphur halogen. These compounds are included herein and in the claims in the term halogen.

Once the stabilization has been effected, the halogen or sulphur halogen can be washed out of the insoluble sulphur with carbon disulphide until none or only a minute trace remains without reducing its stability. The use of the halogen, particularly sulphur monochloride or sulphur bromide, requires an anhydrous system to avoid undue corrosion. In this case the water layer cannot be used and an inert gas such as carbon dioxide is employed as in the flow sheet of Figure 2. The material need not remain in the sulphur after it has been treated for stabilization but can be removed by washing.

As a stabilizer, the term I apply to these materials, one can use a halogen or a sulphur halogen. Since the halogens, particularly chlorine and bromine, react readily with sulphur to form a sulphur halogen, it is difficult to say that one and not the other material is effective and I therefore include all such compounds in the term halogen.

The action of the halogen or sulphur halogen is apparently to react with traces of water present in the insoluble sulphur to be stabilized, forming acidic materials such as hydrogen chloride which have been found to improve the sulphur stability. The need for stabilization is reduced by carrying out operation in a completely anhydrous system. Instead of a halogen or sulphur halogen other materials capable of taking up the water can be used. Materials can also be employed which are capable of furnishing a halogen by hydrolysis upon contact with a water trace in the sulphur. Titanium chloride and bromide, thionyl chloride and phosphorous pentachloride and bromide can be used, although iron compounds should be avoided since ferric chloride and other iron compounds cause reversion rather than stabilization. These materials are essentially chlorine and bromine sources.

The stabilizing treatment of the insoluble sulphur is preferably practiced after the insoluble sulphur has attained its hard, non-plastic, well dispersed condition. To accomplish this, the stabilizing treatment is preferably practiced by bringing the halogen into contact with the sulphur for the requisite period of time after it has been removed from tank 6. The time of contact varies and is shorter the higher the concentration of stabilizer in the solution in which the insoluble sulphur is suspended as a slurry and the higher the temperature at which the insoluble sulphur is stabilized. Retention of the insoluble sulphur in suspension in a carbon disulphide solution containing 1% of stabilizer for 1 hour at 90° to 100° F. has been found to suffice.

STABILIZING OPERATION

Referring particularly to Figure 4, the insoluble sulphur slurry from tank 6 is introduced into washer 29 wherein it is washed with clean carbon disulphide. The washed slurry is taken through line 33 by pump 53 and is forced over through line 171 into a second washer 172. A small quantity of a stabilizing agent, for example, sulphur monochloride, is fed into line 171 through line 174. In the second washer, the insoluble sulphur product is brought into intimate contact with the sulphur monochloride, the sulphur product being maintained in the washer for an adequate period of time to ensure the necessary contact and also to permit the stabilizer to be washed out of the sulphur. The treated stabilized sulphur, free of stabilizer, is removed from the bottom of the washer 172 through line 176, pump 177 forcing the sulphur slurry through line 178 to a drum drier or other suitable recovery device.

The carbon disulphide containing sulphur monochloride is treated to recover the carbon disulphide and the sulphur monochloride. The liquid mixture is taken off through line 181 at the top of washer 172 and is delivered to a fractionating column 183. In this, the sulphur monochloride is separated from the carbon disulphide, which is taken off as an overhead vapor through line 184 into a condenser 186 from which it is delivered as a liquid through line 187 into a tank 188. In order to minimize the loss of $CS_2$ and sulphur monochloride by their reaction to form carbon tetrachloride and sulphur, fractionating column 183 should preferably be a glass lined vessel, since iron catalyzes the reaction to form carbon tetrachloride on heating. A pump 189 removes the recovered carbon disulphide through line 190 and delivers it through line 191 into the base of the washer 172. The sulphur monochloride separating in column 183 is removed through line 192 and is returned through line 174 into the incoming stream of sulphur-carbon disulphide delivered through line 171. The carbon disulphide removed from washer 29 is taken through line 201 into a fractionating column 202 wherein the carbon disulphide is separated from the soluble sulphur present, the latter collecting in re-boiler section 204, being removed as desired through line 206.

The overhead stream of carbon disulphide vapor is removed through line 210 into a condenser 211, the liquefied carbon disulphide passing to drum 212 from which it is removed through line 213 and pump 214 for return through line 216 to washer 29.

GRANULAR SULPHUR

If a halogen be present when the sulphur vapor is quenched in tank 6, a granular product is produced. The best description of this is that it is about the size and shape of corn which has been exploded by gently heating the corn kernels until the corn "pops" and "pop-corn" results. Contrary to statements in the literature, quenching of the sulphur vapor in the presence of a halogen does not improve the yield of carbon disulphide insoluble sulphur or its stability.

In case it is desired to produce a granular sulphur product, the halogen or sulphur halogen can be introduced with the sulphur feed to the vaporizer. The carbon bisulphide solution leaving the top of the washer 29 will contain both soluble sulphur and the halogen or sulphur halogen. This halogen or sulphur halogen is concentrated in the molten sulphur accumulated in the bottom of the fractionating tower 41 in Figure 2.

The soluble sulphur returned to the melter 44 through line 43 can carry a considerable portion of the stabilizer, particularly when sulphur monochloride is employed. The stabilizer sulphur mixture is then vaporized and fed into the quenching vessel. This manner of operation is particularly effective in providing a granular product.

LOW TEMPERATURE VAPORIZATION

For operating reasons, it is sometimes desirable to reduce the temperature at which the sulphur is vaporized. In Figure 2 I have shown the sulphur vaporizer 10 as comprising a closed vessel 202 fed with molten sulphur by line 201 from sulphur melter 44, and suitably heated to provide a stream of sulphur vapor for emission through line 14. Line 38 is extended by pipe 203 to deliver the quenching medium, such as carbon disulphide, to the vaporizer, the quenching medium being injected below the surface of the molten sulphur in the sulphur vaporizer. With carbon disulphide present in the vaporizer, the sulphur vaporization temperature can be lowered for example from 832° F. to 690° F., by vaporizing equal weights of carbon disulphide and sulphur. The attack of sulphur on the metal of which the vaporizer is constructed is less when the sulphur is vaporized at a lower temperature. In addition a finer dispersion of the sulphur is obtained when it is injected into this liquid carbon disulphide as a mixture with carbon disulphide vapor.

I claim:

1. A process for production of sulphur comprising quenching sulphur vapor by introducing a stream of sulphur vapor into a body of carbon disulphide to quench the sulphur and form finely divided solid sulphur in said body, and recovering said finely divided sulphur from said body.

2. A process for production of S mu comprising quenching sulphur vapor in a liquid inert to sulphur and part of which is vaporized upon contact with the sulphur vapor, collecting the quenched sulphur in a body of said liquid, said liquid being a solvent for only S lambda, removing the liquid containing the quenched sulphur and recovering the S mu carried by the liquid.

3. A process for production of S mu comprising quenching sulphur vapor in a liquid inert to sulphur and part of which is vaporized upon contact with the sulphur vapor, collecting the quenched sulphur in a body of said liquid to form a slurry therewith, said liquid being a solvent for only S lambda, removing the slurry containing the quenched sulphur and recovering the S mu carried by the slurry.

4. A process for production of sulphur comprising quenching sulphur vapor by introducing a stream of said vapor into a body of carbon disulphide to remove from said sulphur vapor stream sufficient heat to condense substantially all of the sulphur, said carbon disulphide body being sufficient to dissolve the carbon disulphide soluble sulphur formed.

5. A process for production of sulphur comprising quenching sulphur vapor by introducing a stream of sulphur vapor into a body of a non-aqueous liquid medium inert to the sulphur to quench the sulphur, said liquid being vaporized by the sulphur vapor introduced, and contacting additional liquid with said vaporized liquid to condense at least part of said vaporized liquid and wash out any entrained sulphur in said vaporized liquid.

6. A process for production of sulphur comprising quenching sulphur vapor by introducing a stream of said vapor into a body of an inert non-aqueous liquid medium to remove from said sulphur vapor stream sufficient heat to condense substantially all of the sulphur to a solid, and maintaining said solid in contact with said liquid for several hours.

7. A process for production of sulphur comprising quenching sulphur vapor by introducing a stream of said vapor into a body of an inert non-aqueous liquid medium to remove from said sulphur vapor stream sufficient heat to condense substantially all of the sulphur to a solid, said liquid being a solvent for only S lambda, and maintaining said solid in contact with said liquid for several hours.

8. A process for production of sulphur mu comprising quenching sulphur vapor under substantially anhydrous conditions with a non-aqueous liquid medium substantially inert to sulphur and which, under the conditions of the quenching, is vaporized to provide cooling for the sulphur vapor and form a finely divided solid sulphur insoluble in carbon bisulphide, and recovering and drying the finely divided solid sulphur under substantially anhydrous conditions.

9. A process for producing finely divided sulphur comprising discharging a stream of sulphur vapor into contact with a body of a non-aqueous liquid inert to the sulphur to quench the sulphur and form a dispersion in said body of finely divided flocculent, plastic sulphur, maintaining said sulphur dispersion in said body until said sulphur becomes well dispersed and non-plastic, and recovering said sulphur.

10. A process for producing finely divided sulphur comprising discharging a stream of sulphur vapor into contact with a body of a non-aqueous liquid inert to the sulphur to quench the sulphur and form a dispersion in said body of finely divided flocculent, plastic sulphur, maintaining said sulphur dispersion in said body for a period from 1 to about 24 hours, and then recovering said sulphur.

11. A process for producing finely divided sulphur comprising discharging a stream of sulphur vapor into contact with a body of a non-aqueous liquid inert to the sulphur to quench the sulphur and form a dispersion in said body of finely divided flocculent, plastic sulphur, maintaining said sulphur dispersion in said body for a period of about 1 to 4 hours, and then recovering said sulphur.

12. A process for production of S mu comprising quenching sulphur vapor in a liquid inert to sulphur and part of which is vaporized upon contact with the sulphur vapor, collecting the quenched sulphur in a body of said liquid, said liquid being a solvent for only S lambda, removing the liquid containing the quenched sulphur, separating the S mu carried by the liquid and contacting the separated S mu with a halogen to remove water and stabilize the S mu against reversion.

13. A process for production of S mu comprising quenching sulphur vapor in a liquid inert to sulphur and part of which is vaporized upon contact with the sulphur vapor, collecting the quenched sulphur in a body of said liquid to form a slurry therewith, said liquid being a solvent for only S lambda, removing the slurry containing the quenched sulphur, permitting said sulphur to remain in contact with said liquid for at least an hour, recovering the S mu carried by the slurry, and contacting the recovered S mu with a halogen to stabilize the S mu against reversion.

14. A process for production of insoluble sulphur comprising heating sulphur to provide a vapor stream thereof, continuously introducing said stream into contact with a volatile inert non-aqueous liquid to quench the vapor and form solid sulphur, recovering the quenched solid sulphur from the liquid, and contacting the recovered sulphur with a small quantity of a halogen.

15. A process for production of finely divided sulphur mu comprising quenching sulphur vapor by introducing into a stream of said vapor sufficient of an inert non-aqueous liquid medium to remove from said sulphur vapor stream sufficient heat to condense substantially all of the sulphur, recovering the quenched, finely divided solid sulphur mu, and washing the recovered sulphur mu with a liquid carrying a quantity of a halogen stabilizing S mu against reversion to S lambda.

16. A process for production of finely divided sulphur mu comprising quenching sulphur vapor with a non-aqueous liquid medium substantially inert to sulphur and which, under the conditions of the quenching, is partially vaporized to provide cooling for the sulphur vapor, recovering the quenched, finely divided solid sulphur mu, and washing the recovered sulphur mu with a liquid carrying a quantity of a halogen sufficient to stabilize S mu against reversion to S lambda.

17. A process for production of finely divided sulphur mu comprising quenching sulphur vapor with a non-aqueous liquid medium substantially inert to sulphur and which, under the conditions of the quenching, is partially vaporized to provide cooling for the sulphur vapor, recovering the quenched, finely divided solid sulphur mu, and washing the recovered sulphur mu with a liquid carrying a quantity of a halogen sufficient to stabilize S mu against reversion to S lambda, recovering the S mu and washing it with a halogen solvent to rid the S mu of at least a substantial portion of the halogen.

18. A process for production of sulphur comprising quenching sulphur vapor by introducing into a stream of said vapor sufficient of an inert non-aqueous liquid medium to remove from said sulphur vapor stream sufficient heat to condense substantially all of the sulphur and form a flocculent plastic sulphur product, and maintaining the sulphur product at a temperature whereat the product becomes a well dispersed, finely divided non-plastic sulphur.

19. A process for production of sulphur comprising vaporizing sulphur and a liquid to form a vapor stream, quenching said stream in a body of said liquid to form a slurry of solid sulphur mu in said body, said liquid being a solvent for only S lambda.

20. A process for production of sulphur comprising vaporizing sulphur and a liquid to form a vapor stream and quenching said stream with additional liquid to condense and solidify the sulphur mu as a finely divided solid, the liquid being a solvent for only S lambda.

21. Process for producing finely divided sulphur comprising contacting sulphur in vapor form with descending streams of an inert nonaqueous liquid in sufficient quantities to condense substantially all the sulphur to solid finely divided condition and to form a slurry of said solid sulphur in said liquid, and maintaining said sulphur suspended in said liquid until the crystals thereof become definite and nonplastic.

22. A process for producing S mu which comprises contacting sulphur vapors with a nonaqueous liquid which is a solvent for sulphur lambda at a temperature and in such manner that finely divided solid sulphur is produced and a suspension of said sulphur in said liquid is obtained, maintaining said sulphur in said suspension until a substantial conversion into nonplastic crystals of S mu occurs, and separating S mu from said liquid.

23. A process for producing sulphur which comprises contacting sulphur vapors with a nonaqueous liquid which is a solvent for sulphur lambda at a temperature and in such manner that finely divided solid sulphur is produced and a suspension of said sulphur in said liquid is obtained, maintaining said sulphur in said suspension until a substantial conversion into nonplastic crystals of sulphur occurs, and separating the sulphur from said liquid.

24. Process for producing sulphur in finely divided form comprising contacting sulphur in vapor form with an inert nonaqueous liquid in sufficient quantity to condense substantially all the sulphur to solid finely divided condition and form a slurry of said solid sulphur in said liquid, and maintaining said sulphur suspended in said liquid until the crystals thereof become definite and nonplastic.

ARNOLD BELCHETZ.

REFERENCES CITED

The following references are of record in the file of this patent:

FOREIGN PATENTS

| Number | Country | Date |
|--------|---------|------|
| 474,191 | British | Oct. 27, 1937 |

OTHER REFERENCES

Mellor, "Inorganic and Theoretical Chemistry," vol 10, pages 30, 31. Pub. by Longmans, Green and Co., London (1930).